United States Patent
Jiang et al.

(10) Patent No.: US 9,899,735 B2
(45) Date of Patent: Feb. 20, 2018

(54) SIGNAL TRANSMISSION METHOD, INTERFACE EXTENSION APPARATUS, AND COMMUNICATIONS SYSTEM

(71) Applicant: Huawei Technologies Co., Ltd., Shenzhen (CN)

(72) Inventors: Lixin Jiang, Shenzhen (CN); Jian Shen, Shenzhen (CN); Yanmin Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/407,495

(22) Filed: Jan. 17, 2017

(65) Prior Publication Data
US 2017/0125898 A1    May 4, 2017

Related U.S. Application Data

(63) Continuation of application No. PCT/CN2014/082560, filed on Jul. 18, 2014.

(51) Int. Cl.
*H04M 1/00* (2006.01)
*H01Q 3/00* (2006.01)
(Continued)

(52) U.S. Cl.
CPC .............. *H01Q 3/005* (2013.01); *H01Q 1/246* (2013.01); *H04W 16/28* (2013.01)

(58) Field of Classification Search
CPC ........ H01Q 3/005; H01Q 1/246; H04W 16/28
(Continued)

(56) References Cited

U.S. PATENT DOCUMENTS

2011/0237315 A1    9/2011    Seeor et al.

FOREIGN PATENT DOCUMENTS

| CN | 1905399 A | 1/2007 |
|---|---|---|
| CN | 101827374 A | 9/2010 |

(Continued)

OTHER PUBLICATIONS

Machine Translation and Abstract of Chinese Publication No. CN102780090, Nov. 14, 2012, 9 pages.
(Continued)

*Primary Examiner* — Nay A Maung
*Assistant Examiner* — Angelica M Perez
(74) *Attorney, Agent, or Firm* — Conley Rose, P.C.

(57) ABSTRACT

An interface extension apparatus is presented, which includes N input interfaces and M output interface, where the input interfaces are connected to at least one base station, and the output interfaces are connected to an RET. The apparatus obtains device information of each RET control device in multiple RET control devices; creates an agent for each RET control device according to the device information, where a mapping relationship exists between each RET control device and the corresponding agent; then modulates, using the agent corresponding to the RET control device, a control signal that is received from the at least one base station; and further sends a modulated control signal to a corresponding RET. The embodiments of the present disclosure are used by the multiple base stations to simultaneously manage the multiband RET antenna.

17 Claims, 3 Drawing Sheets

(51) Int. Cl.
*H04W 16/28* (2009.01)
*H01Q 1/24* (2006.01)
(58) Field of Classification Search
USPC .................................................. 455/562.1
See application file for complete search history.

(56) References Cited

FOREIGN PATENT DOCUMENTS

| | | | |
|---|---|---|---|
| CN | 102780090 A | | 11/2012 |
| CN | 103414020 A | | 11/2013 |
| EP | 2469790 A | | 6/2012 |
| EP | 3016205 | * | 5/2016 |
| EP | 3016205 A1 | | 5/2016 |

OTHER PUBLICATIONS

Foreign Communication From a Counterpart Application, European Application No. 14897554.3, Extended European Search Report dated May 11, 2017, 8 pages.
Foreign Communication From a Counterpart Application, PCT Application No. PCT/CN2014/082560, English Translation of International Search Report dated Mar. 31, 2015, 2 pages.
Foreign Communication From a Counterpart Application, PCT Application No. PCT/CN2014/082560, English Translation of Written Opinion dated Mar. 31, 2015, 8 pages.

* cited by examiner

SIGNAL TRANSMISSION METHOD, INTERFACE EXTENSION APPARATUS, AND COMMUNICATIONS SYSTEM

CROSS-REFERENCE TO RELATED APPLICATIONS

This application is a continuation of International Application No. PCT/CN2014/082560, filed on Jul. 18, 2014, the disclosure of which is hereby incorporated by reference in its entirety.

TECHNICAL FIELD

The present disclosure relates to the communications field, and in particular, to a signal transmission method, an interface extension apparatus, and a communications system.

BACKGROUND

A remote electrical tilt (RET) antenna refers to a mobile antenna that allows an electrical downtilt to be adjusted electrically. A remote control unit (RCU) of the RET antenna is a core component for adjusting an electrical downtilt of an antenna and remotely monitoring an antenna status in real time. By adjusting the electrical downtilt of the antenna, network coverage can be effectively enhanced and optimized.

With continuous release of spectral resources and a continuously increasing requirement of a user for communication bandwidth, a multiband RET antenna becomes a significant development direction of a wireless base station antenna. However, with an increase in a quantity of wireless base station antennas, a problem that antenna installation platform space of a base station site gets increasingly limited occurs. To save the antenna installation platform space, an antenna feeder networking mode in which a multiband antenna is used and multiple base stations share an antenna feeder becomes an effective means for resolving the problem. Because a RET antenna can remotely adjust an electrical downtilt without manually visiting a site or climbing a tower, with a high labor cost at present, application of a multiband RET antenna to antenna feeder networking of a wireless network becomes increasingly common. Currently, most multiband RET antennas provide only one Antenna Interface Standards Group (AISG) interface. As a result, the multiband RET antenna can establish a communication connection to only one base station, and the multiband RET antenna cannot satisfy a requirement for sharing an antenna feeder by multiple base stations and separately controlling an electrical downtilt by the multiple base stations.

SUMMARY

Embodiments of the present disclosure provide a signal transmission method, an interface extension apparatus, and a communications system, so as to resolve a problem that a multiband RET antenna with only one AISG interface cannot simultaneously communicate with multiple base stations.

According to a first aspect, an interface extension apparatus is provided, including a transceiver module configured to obtain device information of each RET control device in multiple RET control devices; and a processing module configured to create an agent for each RET control device according to the device information of each RET control device, where a mapping relationship exists between each RET control device and the corresponding agent; where the transceiver module is further configured to receive a control signal from at least one base station, where the control signal carries RET identification information; the processing module is configured to determine, according to the RET identification information carried by the control signal, a first RET control device that receives the control signal, and determine, according to the mapping relationship between each RET control device and the corresponding agent, an agent corresponding to the first RET control device, and the processing module is configured to modulate, using the agent corresponding to the first RET control device, the control signal to obtain a modulated control signal; and the transceiver module is further configured to send the modulated control signal to the first RET control device.

With reference to the first aspect, in a first possible implementation manner of the first aspect, the transceiver module is configured to schedule the modulated control signal, so as to serially send, to corresponding RET control devices, multiple modulated control signals corresponding to the at least one base station.

With reference to the first aspect or the first possible implementation manner of the first aspect, in a second possible implementation manner of the first aspect, the interface extension apparatus communicates with the at least one base station using an AISG protocol, and the interface extension apparatus communicates with the RET control device using the AISG protocol.

With reference to any one of the first aspect to the second possible implementation manner of the first aspect, in a third possible implementation manner of the first aspect, the control signal includes a data link layer message and an application layer message that are sent by the at least one base station.

With reference to any one of the first aspect to the third possible implementation manner of the first aspect, in a fourth possible implementation manner of the first aspect, the device information includes a device serial number, a device type, and an antenna frequency band of the corresponding RET control device.

According to a second aspect, an interface extension apparatus is provided, including N input interfaces configured to respectively connect to N base stations; M output interfaces configured to respectively connect to M AISG communications buses, where each AISG communications bus is connected to P antenna RET modules, each antenna RET module includes L remote control units RCUs, and each of the RCUs includes multiple RET control devices, where P, M, N, and L are positive integers greater than or equal to 1, and N is greater than or equal to M, where the M output interfaces are configured to obtain device information of each RET control device in the multiple RET control devices; and a processor configured to create an agent for each RET control device according to the device information of each RET control device, where a mapping relationship exists between each RET control device and the corresponding agent; where the N input interfaces are configured to receive a control signal from at least one base station, where the control signal carries RET identification information; the processor is further configured to determine, according to the RET identification information carried by the control signal, a first RET control device that receives the control signal, and determine, according to the mapping relationship between each RET control device and the corresponding agent, an agent corresponding to the first RET control device, and the processor is configured to modulate, using the agent corresponding to the first RET control device, the control signal to obtain a modulated control signal; and the M output interfaces are further configured to send the modulated control signal to the first RET control device.

With reference to the second aspect, in a first possible implementation manner of the second aspect, the M output interfaces are configured to schedule the modulated control signal, so as to serially send, to corresponding RET control devices, multiple modulated control signals corresponding to the at least one base station.

With reference to the second aspect or the first possible implementation manner of the second aspect, in a second possible implementation manner of the second aspect, the interface extension apparatus establishes, on the N input interfaces and the M output interfaces, communication connections between the antenna RET modules and the at least one base station using a standard protocol, so that the N base stations simultaneously manage the P antenna RET modules.

With reference to any one of the second possible implementation manner of the second aspect, in a third possible implementation manner of the second aspect, the standard protocol is an AISG protocol.

With reference to any one of the second aspect to the third possible implementation manner of the second aspect, in a fourth possible implementation manner of the second aspect, the control signal includes a data link layer message and an application layer message that are sent by the at least one base station.

With reference to any one of the second aspect to the fourth possible implementation manner of the second aspect, in a fifth possible implementation manner of the second aspect, the device information includes a device serial number, a device type, and an antenna frequency band of the corresponding RET control device.

According to a third aspect, a communications system is provided, where the communications system includes an interface extension apparatus, at least one RET control device, and at least one base station, an input interface of the interface extension apparatus is connected to the base station, and an output interface of the interface extension apparatus is connected to the RET control device, where the interface extension apparatus is configured to obtain device information of each RET control device, and create an agent for each RET control device according to the device information of each RET control device, where a mapping relationship exists between each RET control device and the corresponding agent; the at least one base station is configured to send a control signal to the interface extension apparatus, where the control signal carries RET identification information; the interface extension apparatus is further configured to determine, according to the RET identification information carried by the control signal, a first RET control device that receives the control signal; determine, according to the mapping relationship between each RET control device and the corresponding agent, an agent corresponding to the first RET control device; and further modulate, using the agent corresponding to the first RET control device, the control signal to obtain a modulated control signal; the interface extension apparatus is further configured to send the modulated control signal to the first RET control device; and the first RET control device performs an antenna electrical downtilt adjustment according to the control signal.

With reference to the third aspect, in a first possible implementation manner of the third aspect, when powered on, the interface extension apparatus sends a scan signal to each RET control device connected to the output interface, so as to obtain the device information of each RET control device.

With reference to the third aspect or the first possible implementation manner of the third aspect, in a second possible implementation manner of the third aspect, when sending the modulated control signal, the interface extension apparatus schedules the modulated control signal, so as to serially send, to corresponding RET control devices, multiple modulated control signals corresponding to the at least one base station.

With reference to any one of the third aspect to the second possible implementation manner of the third aspect, in a third possible implementation manner of the third aspect, the interface extension apparatus communicates with the at least one base station using an AISG protocol, and the interface extension apparatus communicates with the RET control device using the AISG protocol.

With reference to any one of the third aspect to the third possible implementation manner of the third aspect, in a fourth possible implementation manner of the third aspect, the control signal includes a data link layer message and an application layer message that are sent by the at least one base station.

With reference to any one of the third aspect to the fourth possible implementation manner of the third aspect, in a fifth possible implementation manner of the third aspect, the device information includes a device serial number, a device type, and an antenna frequency band of the corresponding RET.

According to a fourth aspect, a signal transmission method is provided, including obtaining, by an interface extension apparatus, device information of each RET control device in multiple RET control devices; creating, by the interface extension apparatus, an agent for each RET control device according to the device information of each RET control device, where a mapping relationship exists between each RET control device and the corresponding agent; receiving, by the interface extension apparatus, a control signal from at least one base station, where the control signal carries RET identification information; and determining, by the interface extension apparatus according to the RET identification information carried by the control signal, a first RET control device that receives the control signal, determining, according to the mapping relationship between each RET control device and the corresponding agent, an agent corresponding to the first RET control device, further modulating, using the agent corresponding to the first RET control device, the control signal to obtain a modulated control signal, and sending the modulated control signal to the first RET control device.

With reference to the fourth aspect, in a first possible implementation manner of the fourth aspect, the sending the modulated control signal to the first RET control device includes scheduling, by the interface extension apparatus, the modulated control signal, so as to serially send, to corresponding RET control devices, multiple modulated control signals corresponding to the at least one base station.

With reference to the fourth aspect or the first possible implementation manner of the fourth aspect, in a second possible implementation manner of the fourth aspect, the interface extension apparatus communicates with the at least one base station using an AISG protocol, and the interface extension apparatus communicates with the RET control device communicate using the AISG protocol.

With reference to any one of the fourth aspect to the second possible implementation manner of the fourth aspect, in a third possible implementation manner of the fourth aspect, the control signal includes a data link layer message and an application layer message that are sent by the at least one base station.

With reference to any one of the fourth aspect to the third possible implementation manner of the fourth aspect, in a fourth possible implementation manner of the fourth aspect, the device information includes a device serial number, a device type, and an antenna frequency band of the corresponding RET control device.

The embodiments of the present disclosure provide a signal transmission method, an interface extension apparatus, and a communications system. The communications system includes an interface extension apparatus, at least one base station, and at least one RET. The interface extension apparatus includes N input interfaces and M output interfaces. The input interfaces of the interface extension apparatus are connected to the at least one base station, and the output interfaces are connected to the RET. The interface extension apparatus obtains device information of each RET control device in multiple RET control devices, and creates an agent for each RET control device according to the device information of each RET control device, where a mapping relationship exists between each RET control device and the corresponding agent. Then the interface extension apparatus receives a control signal from the at least one base station, where the control signal carries RET identification information; determines, according to the RET identification information carried by the control signal, a first RET control device that receives the control signal; and determines, according to the mapping relationship between each RET control device and the corresponding agent, an agent corresponding to the first RET control device. A processing module is configured to modulate, using the agent corresponding to the first RET control device, the control signal to obtain a modulated control signal. The modulated control signal is sent to the first RET control device. In this way, if a multiband RET antenna in the prior art has only one interface, a communication connection between a base station and an RET is established using the extension interface extension apparatus. The interface extension apparatus is connected to at least one base station, and sends, by establishing an agent for each RET, a control signal of the base station to the corresponding RET using the agent, so that when the multiband RET antenna provides insufficient interfaces, the interface extension apparatus can simultaneously communicate with multiple base stations using the interface extension apparatus.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
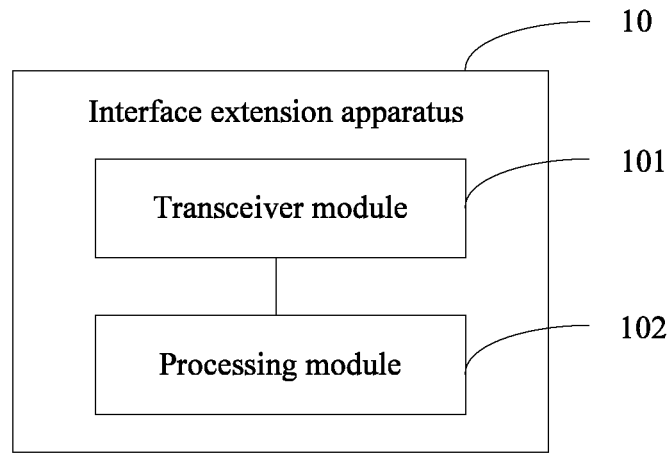
FIG. 1 is a block diagram of an interface extension apparatus according to an embodiment of the present disclosure.

An embodiment of the present disclosure provides an interface extension apparatus 10. As shown in FIG. 1, the interface extension apparatus 10 includes a transceiver module 101 and a processing module 102.

The transceiver module 101 is configured to obtain device information of each RET control device in multiple RET control devices.

The processing module 102 is configured to create an agent for each RET control device according to the device information of each RET control device, where a mapping relationship exists between each RET control device and the corresponding agent.

The transceiver module 101 is further configured to receive a control signal from at least one base station, where the control signal carries RET identification information.

The processing module 102 is further configured to determine, according to the RET identification information carried by the control signal, a first RET control device that receives the control signal, and determine, according to the mapping relationship between each RET control device and the corresponding agent, an agent corresponding to the first RET control device, and the processing module is configured to modulate, using the agent corresponding to the first RET control device, the control signal to obtain a modulated control signal.

The transceiver module 101 is further configured to send the modulated control signal to the first RET control device.

The interface extension apparatus (referred to as an RET Expansion Unit, REU) 10 has multiple input interfaces and at least one output interface. The input interfaces are separately connected to the base station, and the output interface is connected to the RET control device. The RET control device may perform an electrical downtilt adjustment according to the control signal sent by the base station.

Further, an implementation manner in which the transceiver module 101 obtains the device information of each RET control device may be as follows. When powered on and establishing communication connections to the RET control devices, the extension apparatus 10 sends a scan signal to each RET control device to obtain the device information of each RET control device. When performing scanning, the interface extension apparatus 10 herein may communicate with the RET control device using the 485 communications protocol. The interface extension apparatus 10 is equivalent to a master device, and each RET control device is equivalent to a slave device. The master device may be connected to the multiple RET control devices using a bus, and control each RET control device.

The device information may include but is not limited to a device serial number, a device type, an antenna frequency band, and the like of the RET control device. The device type may include a single-band RET control device or a multi-band RET control device.

Further, after the transceiver module 101 obtains the device information of each RET control device, the processing module 102 may allocate an address to each RET according to the device information of each RET control device, and then correspondingly send the allocated address to each RET control device according to the device information, so that the interface extension apparatus 10 communicates with each RET control device according to the allocated address.

Moreover, the processing module 102 may create the agent for each RET according to the device information of each RET control device. Each agent includes the corresponding device information of each RET control device, and the agent is used by the processing module 102 to modulate, according to the agent, the control signal that is received from the base station, so as to obtain a control signal that is suitable for sending between the interface extension apparatus and a corresponding RET control device that receives the control signal.

The control signal herein may include a data link layer message and an application layer message that are sent by the base station to the RET control device. When the processing module 102 implements, according to the agent, modulation on the data link layer message sent by the base station, because a communication address, command code, and the like set between the interface extension apparatus and the base station are different from a communication address, command code, and the like set between the interface extension apparatus 10 and the RET control device, the processing module 102 modulates the data link layer message after the interface extension apparatus 10 receives the data link layer message sent by the base station, and replaces the communication address, the command code, and the like with a data link layer message for communicating with the RET control device. For the application layer message, the interface extension apparatus 10 forwards the application layer message between the base station and the RET control device according to information about the corresponding agent. That is, in the present disclosure, a communication link is established between the base station and the RET control device in an agent manner. A quantity and type of agents are consistent with a quantity and type of corresponding RET control devices.

When establishing the corresponding agent for each RET control device, the processing module 102 simultaneously establishes a mapping relationship between each RET control device and the corresponding agent. In this way, after the transceiver module 101 receives the control signal sent by the at least one base station, where each control signal includes the corresponding RET identification information, the processing module 102 may determine, according to the identification information, the corresponding first RET control device that receives the control signal, and further determine, according to the mapping relationship between each RET control device and the corresponding agent, the agent corresponding to the first RET control device, so as to modulate, using the agent corresponding to the first RET control device, the control signal that is received from the base station.

The identification information herein may be a corresponding RET serial number, or the like. When multiple base stations simultaneously send control signals to corresponding destination RET control devices, one base station correspondingly controls one RET control device. The first RET control device herein refers to an RET control device corresponding to each base station that sends the control signal.

Further, after the processing module 102 obtains the modulated control signal, the transceiver module 101 may send the modulated control signal to the corresponding RET control device according to the address allocated to each RET by the processing module 102.

The interface extension apparatus 10 has multiple input interfaces, and the multiple input interfaces are separately connected to one base station master device. In this way, when multiple base stations simultaneously manage the RET control devices, because the multiple RET control devices are connected to the interface extension apparatus using one bus, that is, multiple agents in the interface extension apparatus share a serial port communication resource between the apparatus and the RET, the transceiver module 101 may schedule the modulated control signals of the multiple base stations, so as to serially send, to corresponding RET control devices, the modulated control signals corresponding to the base stations, that is, to serialize communication requests simultaneously initiated by the multiple base stations.

Optionally, the interface extension apparatus may communicate with the base station and the RET control device using an AISG protocol. In this way, the interface extension apparatus 10 may support communication with an RET control device of a third party.

When receiving the control signal sent by the corresponding base station, the RET control device performs an antenna electrical downtilt adjustment according to the control signal, and after the adjustment is completed, returns, using the corresponding agent in the interface extension apparatus, a feedback signal to the corresponding base station in a same manner in which the base station sends the control signal to the corresponding RET.

Before the base station sends the control signal to the RET control device, when a communications system with the base station, the interface extension apparatus, and the RET is powered on, the base station may obtain information about each agent in the interface extension apparatus in a scanning manner, so as to first send, when sending the control signal to the RET control device, the control signal to the corresponding agent of the RET control device for modulation, to obtain the modulated control signal.

This embodiment of the present disclosure provides the interface extension apparatus. An input interface of the interface extension apparatus is connected to a base station, and an output interface is connected to an RET. The interface extension apparatus obtains device information of each RET control device in multiple RET control devices, and creates an agent for each RET control device according to the device information of each RET control device, where a mapping relationship exists between each RET control device and the corresponding agent. Then the interface extension apparatus receives a control signal from at least one base station, where the control signal carries RET identification information; determines, according to the RET identification information carried by the control signal, a first RET control device that receives the control signal; and determines, according to the mapping relationship between each RET control device and the corresponding agent, an agent corresponding to the first RET control device. A processing module is configured to modulate, using the agent corresponding to the first RET control device, the control signal to obtain a modulated control signal. The modulated control signal is sent to the first RET control device. In this way, if a multiband RET antenna in the prior art has only one interface, a communication connection between a base station and an RET is established using the interface extension apparatus. The interface extension apparatus is connected to at least one base station, and sends, by establishing an agent for each RET, a control signal of the base station to the corresponding RET using the agent, so that when the multiband RET antenna provides insufficient interfaces, the interface extension apparatus can simultaneously communicate with multiple base stations using the interface extension apparatus.

Figure 2:
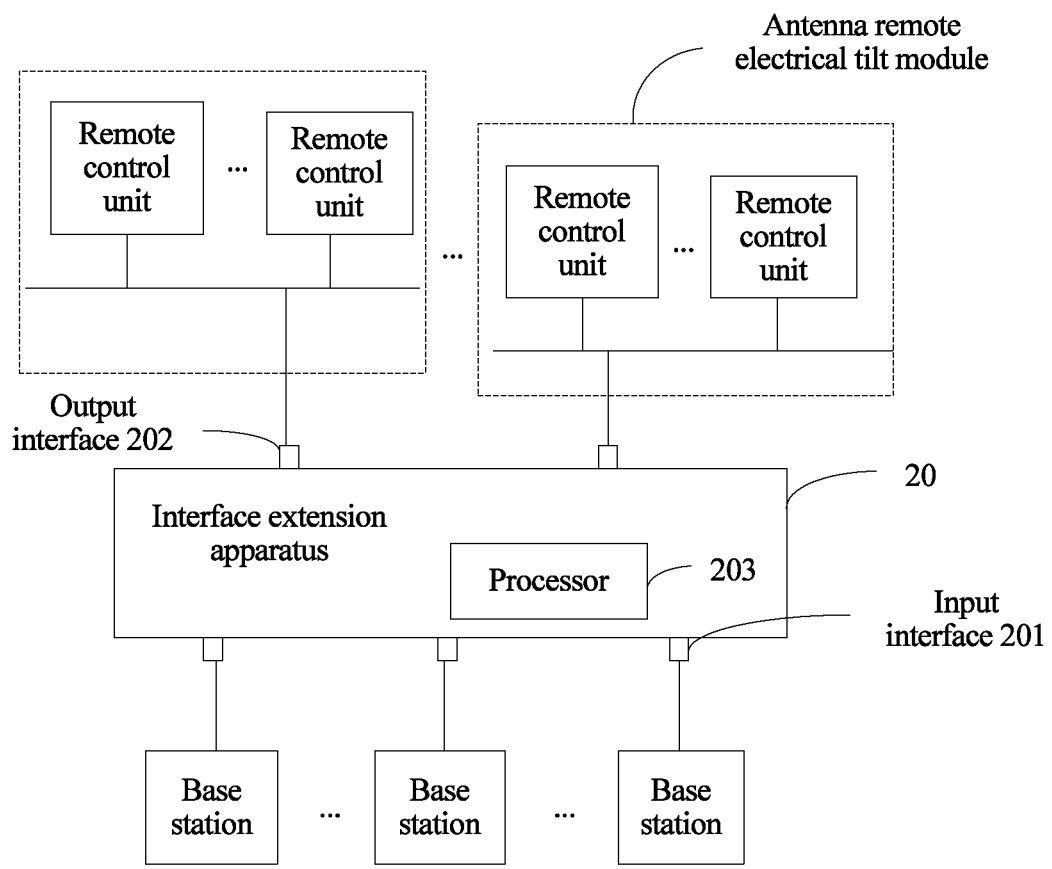
FIG. 2 is a schematic structural diagram of another interface extension apparatus according to another embodiment of the present disclosure.

Based on description of the interface extension apparatus in the foregoing embodiment, from a perspective of a structure, an embodiment of the present disclosure provides an interface extension apparatus 20. As shown in FIG. 2, the interface extension apparatus 20 includes N input interfaces 201, M output interfaces 202, and a processor 203.

The N input interfaces 201 are configured to respectively connect to N base stations.

The M output interfaces 202 are configured to respectively connect to M AISG communications buses, where each AISG communications bus is connected to P antenna RET modules, each antenna RET module includes L remote control units RCUs, and each RCU includes multiple RET control devices, where P, M, N, and L are positive integers greater than or equal to 1, and N is greater than or equal to M.

The M output interfaces 202 are configured to obtain device information of each RET control device in the multiple RET control devices.

The processor 203 is configured to create an agent for each RET control device according to the device information of each RET control device, where a mapping relationship exists between each RET control device and the corresponding agent.

The N input interfaces are configured to receive a control signal from at least one base station, where the control signal carries RET identification information.

The processor 203 is further configured to determine, according to the RET identification information carried by the control signal, a first RET control device that receives the control signal, and determine, according to the mapping relationship between each RET control device and the corresponding agent, an agent corresponding to the first RET control device, and a processor is configured to modulate, using the agent corresponding to the first RET control device, the control signal to obtain a modulated control signal.

The M output interfaces 202 are further configured to send the modulated control signal to the first RET control device.

For example, N may be 3, and M may be 1, or N and M may be other values, which are not limited herein.

Each antenna RET module includes L RCUs, L transmission structures, and L phase shifters. Each RCU includes multiple RET control devices.

Optionally, the M output interfaces 202 may be configured to schedule the modulated control signal, so as to serially send, using the M output interfaces and to corresponding RET control devices, multiple modulated control signals corresponding to the at least one base station.

Optionally, the interface extension apparatus establishes, on the N input interfaces and the M output interfaces, communication connections between the antenna RET modules and the at least one base station using a standard protocol, so that the N base stations simultaneously manage the P antenna RET modules.

Optionally, the standard protocol is an AISG protocol.

Optionally, the control signal includes a data link layer message and an application layer message that are sent by the at least one base station.

Optionally, the device information includes a device serial number, a device type, and an antenna frequency band of the corresponding RET control device.

The identification information herein may be a corresponding RET serial number, or the like. When multiple base stations simultaneously send control signals to corresponding destination RET control devices, one base station correspondingly controls one RET control device. The first RET control device herein refers to an RET control device corresponding to each base station that sends the control signal.

For specific implementation manners of the output interface and the input interface in this embodiment, refer to the transceiver module in the embodiment shown in FIG. 1. For a specific implementation manner of the processor, refer to the processor in the embodiment shown in FIG. 1.

This embodiment of the present disclosure provides the interface extension apparatus. The interface extension apparatus includes N input interfaces and M output interfaces. The input interfaces of the interface extension apparatus are connected to a base station, and the output interfaces are connected to an RET. The interface extension apparatus obtains device information of each RET control device in multiple RET control devices, and creates an agent for each RET control device according to the device information of each RET control device, where a mapping relationship exists between each RET control device and the corresponding agent. Then the interface extension apparatus receives a control signal from at least one base station, where the control signal carries RET identification information; determines, according to the RET identification information carried by the control signal, a first RET control device that receives the control signal; and determines, according to the mapping relationship between each RET control device and the corresponding agent, an agent corresponding to the first RET control device. A processor is configured to modulate, using the agent corresponding to the first RET control device, the control signal to obtain a modulated control signal. The modulated control signal is sent to the first RET control device. In this way, if a multiband RET antenna in the prior art has only one interface, a communication connection between a base station and an RET is established using the interface extension apparatus. The interface extension apparatus is connected to at least one base station, and sends, by establishing an agent for each RET, a control signal of the base station to the corresponding RET using the agent, so that when the multiband RET antenna provides insufficient interfaces, the interface extension apparatus can simultaneously communicate with multiple base stations using the interface extension apparatus.

Figure 3:
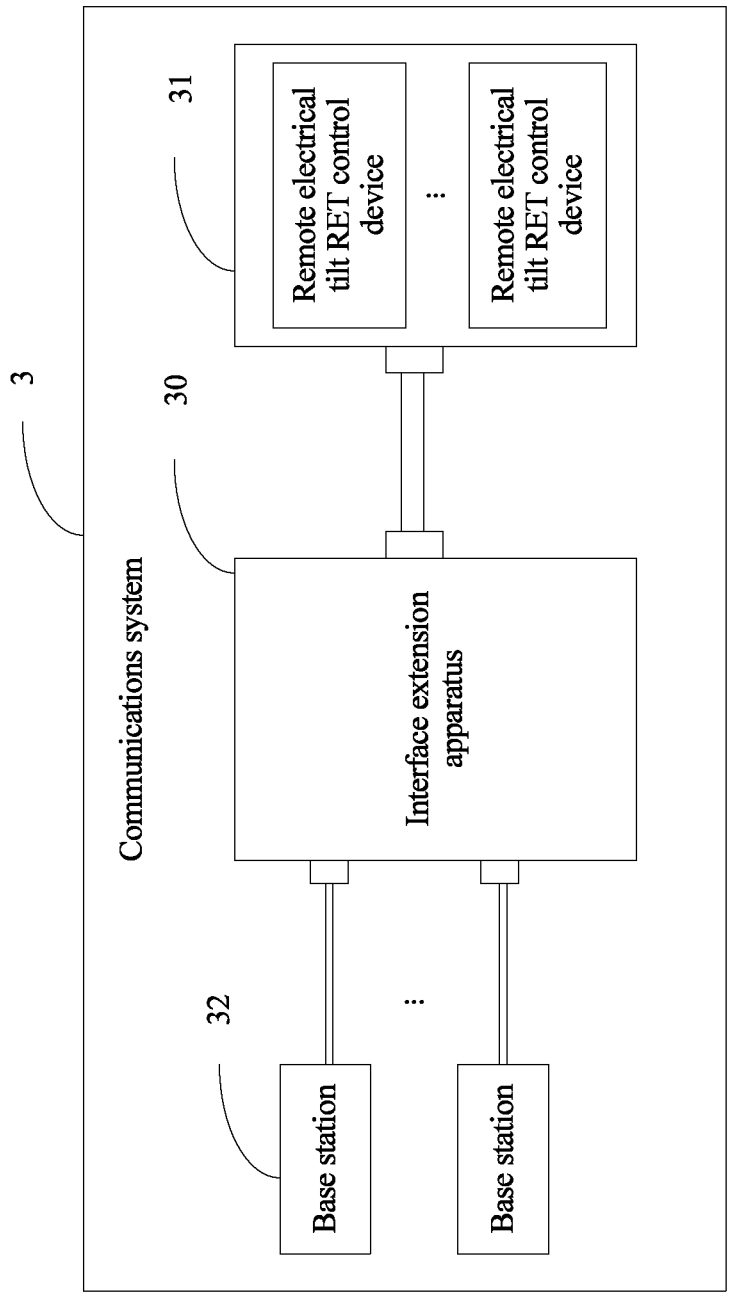
FIG. 3 is a schematic diagram of a communications system according to another embodiment of the present disclosure.

Based on the implementation manners of the interface extension apparatus, the base station, and the RET control device in the embodiment shown in FIG. 1 or in the embodiment shown in FIG. 2, an embodiment of the present disclosure provides a communications system 3. As shown in FIG. 3, the communications system includes an interface extension apparatus 30, at least one RET control device 31, and at least one base station 32. An input interface of the interface extension apparatus 30 is connected to the base station 32, and an output interface of the interface extension apparatus 30 is connected to the RET control device 31.

The interface extension apparatus is configured to obtain device information of each RET control device, and create an agent for each RET control device according to the device information of each RET control device, where a mapping relationship exists between each RET control device and the corresponding agent.

The at least one base station is configured to send a control signal to the interface extension apparatus, where the control signal carries RET identification information.

The interface extension apparatus is further configured to determine, according to the RET identification information carried by the control signal, a first RET control device that receives the control signal; determine, according to the mapping relationship between each RET control device and the corresponding agent, an agent corresponding to the first RET control device; and further modulate, using the agent corresponding to the first RET control device, the control signal to obtain a modulated control signal.

The interface extension apparatus is further configured to send the modulated control signal to the first RET control device.

The first RET control device is configured to perform an antenna electrical downtilt adjustment according to the control signal.

Further, when powered on, the interface extension apparatus sends a scan signal to each RET control device connected to the output interface, so as to obtain the device information of each RET control device connected to the output interface.

Optionally, when sending the modulated control signal, the interface extension apparatus schedules the modulated control signal, so as to serially send, to corresponding RET control devices, multiple modulated control signals corresponding to the at least one base station.

Optionally, the interface extension apparatus communicates with the at least one base station using an AISG protocol, and the interface extension apparatus communicates with the RET control device using the AISG protocol.

The control signal includes a data link layer message and an application layer message that are sent by the base station. The device information may include a device serial number, a device type, and an antenna frequency band of the corresponding RET.

The identification information herein may be a corresponding RET serial number, or the like. When multiple base stations simultaneously send control signals to corresponding destination RET control devices, one base station correspondingly controls one RET control device. The first RET control device herein refers to an RET control device corresponding to each base station that sends the control signal.

For specific implementation manners of the interface extension apparatus, the base station, and the RET control device in this embodiment, refer to the specific implementation manners in the embodiment shown in FIG. 1 or in the embodiment shown in FIG. 2.

This embodiment of the present disclosure provides the communications system. The communications system includes an interface extension apparatus, at least one base station, and at least one RET. An input interface of the interface extension apparatus is connected to the base station, and an output interface is connected to the RET. The interface extension apparatus obtains device information of each RET control device in multiple RET control devices, and creates an agent for each RET control device according to the device information of each RET control device, where a mapping relationship exists between each RET control device and the corresponding agent. Then the interface extension apparatus receives a control signal from the at least one base station, where the control signal carries RET identification information; determines, according to the RET identification information carried by the control signal, a first RET control device that receives the control signal; and determines, according to the mapping relationship between each RET control device and the corresponding agent, an agent corresponding to the first RET control device. A processing module is configured to modulate, using the agent corresponding to the first RET control device, the control signal to obtain a modulated control signal. The modulated control signal is sent to the first RET control device. In this way, if a multiband RET antenna in the prior art has only one interface, a communication connection between a base station and an RET is established using the extension interface extension apparatus. The interface extension apparatus is connected to at least one base station, and sends, by establishing an agent for each RET, a control signal of the base station to the corresponding RET using the agent, so that when the multiband RET antenna provides insufficient interfaces, the interface extension apparatus can simultaneously communicate with multiple base stations using the interface extension apparatus.

Figure 4:
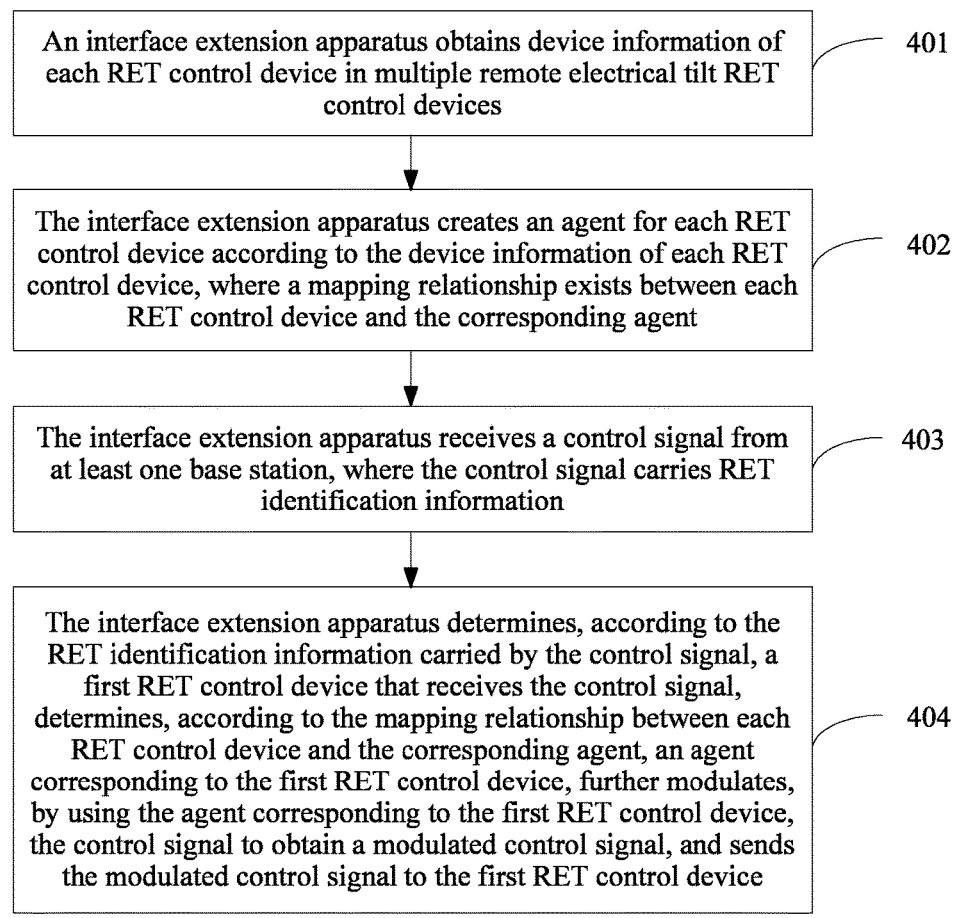
FIG. 4 is a schematic flowchart of a signal transmission method according to another embodiment of the present disclosure.

Based on the embodiments shown in FIG. 1 to FIG. 3, an embodiment of the present disclosure provides a signal transmission method. As shown in FIG. 4, the signal transmission method includes the following steps.

Step 401. An interface extension apparatus obtains device information of each RET control device in multiple RET control devices.

Step 402. The interface extension apparatus creates an agent for each RET control device according to the device information of each RET control device, where a mapping relationship exists between each RET control device and the corresponding agent.

Step 403. The interface extension apparatus receives a control signal from at least one base station, where the control signal carries RET identification information.

Step 404. The interface extension apparatus determines, according to the RET identification information carried by the control signal, a first RET control device that receives the control signal, determines, according to the mapping relationship between each RET control device and the corresponding agent, an agent corresponding to the first RET control device, further modulates, using the agent corresponding to the first RET control device, the control signal to obtain a modulated control signal, and sends the modulated control signal to the first RET control device.

Further, a specific implementation manner of sending the modulated control signal to the first RET control device may be as follows: scheduling, by the interface extension apparatus, the modulated control signal, so as to serially send, to corresponding RET control devices, multiple modulated control signals corresponding to the at least one base station.

The interface extension apparatus may communicates with the at least one base station using an AISG protocol, and the interface extension apparatus may also communicates with the RET control device using the AISG protocol, which may implement interconnection and interworking between the interface extension apparatus and an antenna of a third party.

The control signal herein may include a data link layer message and an application layer message that are sent by the at least one base station.

The device information includes a device serial number, a device type, and an antenna frequency band of the corresponding RET control device.

The identification information herein may be a corresponding RET serial number, or the like. When multiple base stations simultaneously send control signals to corresponding destination RET control devices, one base station correspondingly controls one RET control device. The first RET control device herein refers to an RET control device corresponding to each base station that sends the control signal.

For a specific implementation manner of the steps in this embodiment of the present disclosure, refer to the implementation manner in the embodiment shown in FIG. 1.

This embodiment of the present disclosure provides the signal transmission method. An interface extension apparatus obtains device information of each RET control device in multiple RET control devices, and creates an agent for each RET control device according to the device information of each RET control device, where a mapping relationship exists between each RET control device and the corresponding agent. Then the interface extension apparatus receives a control signal from at least one base station, where the control signal carries RET identification information; determines, according to the RET identification information carried by the control signal, a first RET control device that receives the control signal; and determines, according to the mapping relationship between each RET control device and the corresponding agent, an agent corresponding to the first RET control device. A processing module is configured to modulate, using the agent corresponding to the first RET control device, the control signal to obtain a modulated control signal. The modulated control signal is sent to the first RET control device. In this way, if a multiband RET antenna in the prior art has only one interface, a communication connection between a base station and an RET is established using the extension interface extension apparatus. The interface extension apparatus is connected to at least one base station, and sends, by establishing an agent for each RET, a control signal of the base station to the corresponding RET using the agent, so that when the multiband RET antenna provides insufficient interfaces, the interface extension apparatus can simultaneously communicate with multiple base stations using the interface extension apparatus.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the devices and the systems in the embodiments of the present disclosure may be integrated into one processing unit, or each of the units may have alone physically, or two or more units are integrated into one unit. The unit may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An interface extension apparatus, comprising:
N input interfaces configured to respectively connect to N base stations;
M output interfaces configured to respectively connect to M Antenna Interface Standards Group (AISG) communications buses, wherein each AISG communications bus is connected to P antenna remote electrical tilt (RET) modules, wherein each antenna RET module comprises L remote control units (RCUs), wherein each of the RCUs comprises multiple RET control devices, wherein P, M, N, and L are positive integers greater than or equal to 1, and N is greater than or equal to M, and wherein the M output interfaces are configured to obtain device information of each RET control device in the multiple RET control devices; and
a processor configured to create a corresponding proxy for each RET control device according to the device information of each RET control device,
wherein a mapping relationship exists between each RET control device and the corresponding proxy,
wherein the N input interfaces are configured to receive a control signal from at least one base station, wherein the control signal carries RET identification information,
wherein the processor is further configured to:
determine, according to the RET identification information carried by the control signal, a first RET control device that receives the control signal;
determine, according to the mapping relationship between each RET control device and the corresponding proxy, a proxy corresponding to the first RET control device; and
modulate, using the proxy corresponding to the first RET control device, the control signal to obtain a modulated control signal, and
wherein the M output interfaces are further configured to send the modulated control signal to the first RET control device.

2. The interface extension apparatus according to claim 1, wherein the M output interfaces are configured to schedule the modulated control signal to serially send, to corresponding RET control devices, multiple modulated control signals corresponding to the at least one base station.

3. The interface extension apparatus according to claim 1, wherein the interface extension apparatus establishes, on the N input interfaces and the M output interfaces, communication connections between the antenna remote electrical tilt modules and the at least one base station using a standard protocol, such that the N base stations simultaneously manage the P antenna RET modules.

4. The interface extension apparatus according to claim 3, wherein the standard protocol is an AISG protocol.

5. The interface extension apparatus according to claim 1, wherein the control signal comprises a data link layer message and an application layer message sent by the at least one base station.

6. The interface extension apparatus according to claim 1, wherein the device information comprises a device serial number, a device type, and an antenna frequency band of the corresponding RET control device.

7. A communications system, wherein the communications system comprises an interface extension apparatus, at least one remote electrical tilt (RET) control device, and at least one base station, an input interface of the interface extension apparatus is connected to the at least one base station, and an output interface of the interface extension apparatus is connected to the at least one RET control device, wherein the interface extension apparatus is configured to:
obtain device information of each RET control device of the at least one RET control device; and
create a corresponding proxy for each RET control device of the at least one RET control device according to the device information of each RET control device of the at least one RET control device,
wherein a mapping relationship exists between each RET control device of the at least one RET control device and the corresponding proxy,
wherein the at least one base station is configured to send a control signal to the interface extension apparatus, wherein the control signal carries RET identification information,
wherein the interface extension apparatus is further configured to:
determine, according to the RET identification information carried by the control signal, a first RET control device that receives the control signal;
determine, according to the mapping relationship between each RET control device of the at least one RET control device and the corresponding proxy, a proxy corresponding to the first RET control device;
modulate, using the proxy corresponding to the first RET control device, the control signal to obtain a modulated control signal; and
send the modulated control signal to the first RET control device, and
wherein the first RET control device performs an antenna electrical downtilt adjustment according to the modulated control signal.

8. The communications system according to claim 7, wherein the interface extension apparatus sends a scan signal to each RET control device connected to the output interface to obtain the device information of each RET control device.

9. The communications system according to claim 7, wherein the interface extension apparatus schedules the modulated control signal when sending the modulated control signal to serially send, to corresponding RET control devices, multiple modulated control signals corresponding to the at least one base station.

10. The communications system according to claim 7, wherein the interface extension apparatus communicates with the at least one base station using an Antenna Interface Standards Group (AISG) protocol, and wherein the interface extension apparatus communicates with the RET control device using the AISG protocol.

11. The communications system according to claim 7, wherein the control signal comprises a data link layer message and an application layer message sent by the at least one base station.

12. The communications system according to claim 7, wherein the device information comprises a device serial number, a device type, and an antenna frequency band of the corresponding RET control device.

13. A signal transmission method, comprising:
obtaining, by an interface extension apparatus, device information of each remote electrical tilt (RET) control device of a plurality of RET control devices;
creating, by the interface extension apparatus, a corresponding proxy for each RET control device of the plurality of RET control devices according to the device information of each RET control device, wherein a mapping relationship exists between each RET control device of the plurality of RET control devices and the corresponding proxy;
receiving, by the interface extension apparatus, a control signal from at least one base station, wherein the control signal carries RET identification information;
determining, by the interface extension apparatus according to the RET identification information carried by the control signal, a first RET control device that receives the control signal;
determining, according to the mapping relationship between each RET control device of the plurality of RET control devices and the corresponding proxy, a proxy corresponding to the first RET control device;
modulating, using the proxy corresponding to the first RET control device, the control signal to obtain a modulated control signal; and
sending the modulated control signal to the first RET control device.

14. The method according to claim 13, wherein sending the modulated control signal to the first RET control device comprises scheduling, by the interface extension apparatus, the modulated control signal to serially send, to corresponding RET control devices, multiple modulated control signals corresponding to the at least one base station.

15. The method according to claim 13, wherein the interface extension apparatus communicates with the at least one base station using an Antenna Interface Standards Group (AISG) protocol, and wherein the interface extension apparatus communicates with the RET control device communicate using the AISG protocol.

16. The method according to claim 13, wherein the control signal comprises a data link layer message and an application layer message sent by the at least one base station.

17. The method according to claim 13, wherein the device information comprises a device serial number, a device type, and an antenna frequency band of the corresponding RET control device.

* * * * *